United States Patent
Baker

(10) Patent No.: US 10,292,507 B2
(45) Date of Patent: May 21, 2019

(54) INTERCHANGEABLE IMAGE DISPLAY SYSTEM AND METHOD TO CREATE

(71) Applicant: Raymond Charles Baker, East Peoria, IL (US)

(72) Inventor: Raymond Charles Baker, East Peoria, IL (US)

( * ) Notice: Subject to any disclaimer, the term of this patent is extended or adjusted under 35 U.S.C. 154(b) by 1125 days.

(21) Appl. No.: 14/543,956

(22) Filed: Nov. 18, 2014

(65) Prior Publication Data
US 2016/0135620 A1 May 19, 2016

(51) Int. Cl.
*A47G 1/06* (2006.01)
*G06Q 30/06* (2012.01)

(52) U.S. Cl.
CPC .......... *A47G 1/065* (2013.01); *G06Q 30/0621* (2013.01); *A47G 2001/0672* (2013.01)

(58) Field of Classification Search
CPC ........... A47G 1/065; A47G 2001/0672; G06Q 30/0621
See application file for complete search history.

(56) References Cited

U.S. PATENT DOCUMENTS

| | | | | |
|---|---|---|---|---|
| 3,786,584 A * | 1/1974 | Holson | A47G 1/065 40/124 |
| 4,177,305 A * | 12/1979 | Feingold | B44C 3/123 273/157 R |
| 5,269,083 A * | 12/1993 | Vampatella | A47G 1/065 248/206.5 |
| 5,419,063 A * | 5/1995 | Lane | A45C 11/16 206/6.1 |
| 5,590,500 A * | 1/1997 | McCue | A47B 96/18 52/311.2 |
| 5,667,876 A * | 9/1997 | Radlicz | G09F 7/00 206/449 |
| 5,895,219 A * | 4/1999 | Miller | G09B 17/00 283/46 |
| 6,056,549 A * | 5/2000 | Fletcher | A63H 33/38 283/46 |
| 6,889,458 B2 * | 5/2005 | Copley | A47G 1/0616 40/600 |

(Continued)

OTHER PUBLICATIONS

Author Unknown, Make Your Own Interchangeable Magnetic Memo Board Using a Picture Frame, From Internet site: www.aspottedpony.com, viewed on-line and printed Oct. 17, 2014.

(Continued)

*Primary Examiner* — Cassandra Davis
(74) *Attorney, Agent, or Firm* — Robin S. Fahlberg

(57) ABSTRACT

An interchangeable image display system includes a rigid hard backboard including a backboard front side coated with a protective finish and including at least one photo area, and a backboard back side opposite the backboard front side; one or more rigid hard photo tiles including a photo tile front including an image infused into metal; and a photo tile back; two or more first polarity magnets fixedly attached to the back board front side in each photo area in a first pattern; and two or more second polarity magnets fixedly attached to each of the photo tiles on the photo tile back in a second pattern the mirror image of the first pattern; the second polarity magnets attracted, and removeably attachable to the first polarity magnets.

17 Claims, 16 Drawing Sheets

(56) References Cited

U.S. PATENT DOCUMENTS

| | | | |
|---|---|---|---|
| 8,522,464 B2* | 9/2013 | Rehnberg | B32B 7/12 40/600 |
| 2002/0078612 A1* | 6/2002 | Meacham | G09F 7/04 40/711 |
| 2003/0221349 A1 | 12/2003 | Abe | |
| 2003/0233778 A1 | 12/2003 | Gross | |
| 2005/0193614 A1* | 9/2005 | Conrad | A47G 1/065 40/757 |
| 2006/0143964 A1 | 7/2006 | Chatellier et al. | |
| 2007/0044360 A1* | 3/2007 | Hillis | G09F 7/04 40/621 |
| 2007/0204500 A1* | 9/2007 | Splittgerber | A47G 1/06 40/781 |
| 2010/0229442 A1 | 9/2010 | Snow et al. | |
| 2011/0272550 A1* | 11/2011 | Foltz | A47F 5/0006 248/309.1 |

OTHER PUBLICATIONS

Jeanne Goshe, Change Your Frame with Maggie, From Internet site: www.plywerk.com, viewed on-line and printed Oct. 17, 2014.

* cited by examiner

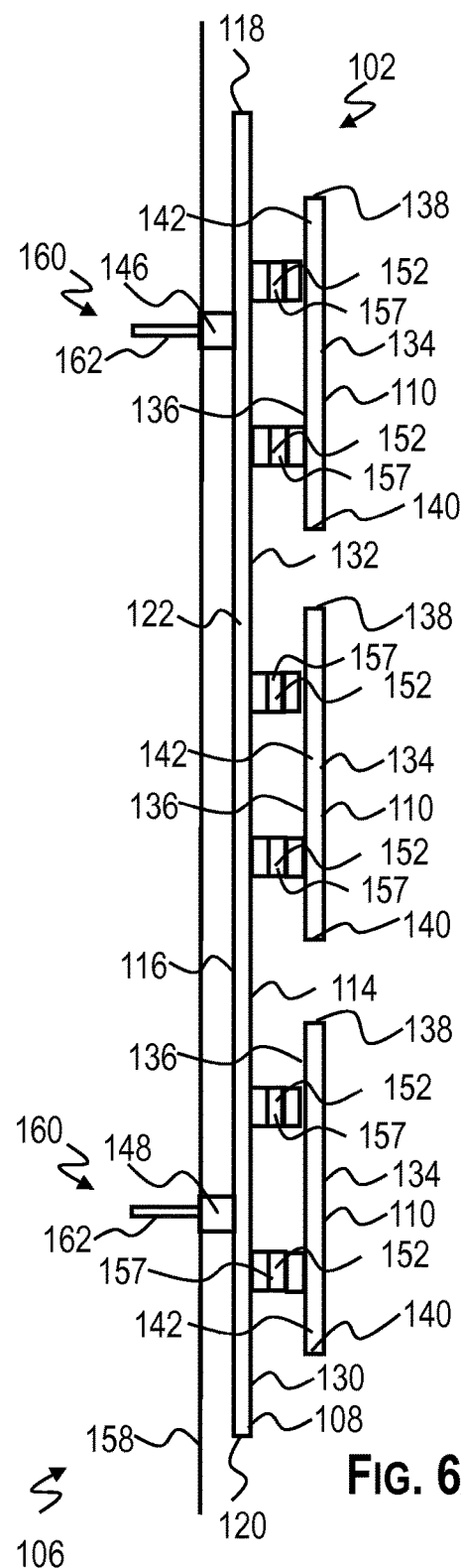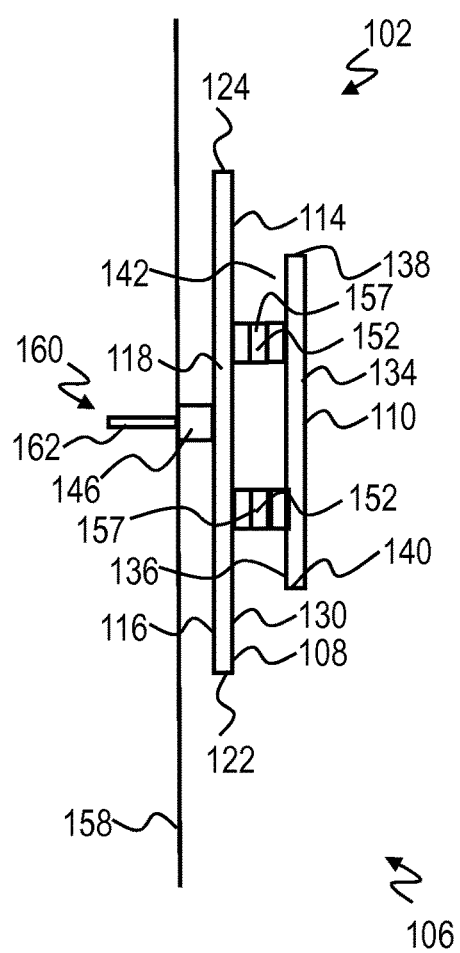
FIG. 6A
FIG. 6B

TABLE 1: EXEMPLARY DISPLAY DEVICE CONFIGURATIONS

| Display Configuration (Row X Columns) | Display Backboard Dimensions (Inches) | Photo Tile Dimensions (Inches) | Channel Width (Inches) | Border Width (Inches) |
|---|---|---|---|---|
| 3X1 | 9X24 | 6X6 | 1.5 | 1.5 |
| 3X1 | 12X32 | 8X8 | 2 | 2 |
| 2X2 | 16.5X16.5 | 6X6 | 1.5 | 1.5 |
| 2X2 | 22X22 | 8X8 | 2 | 2 |
| 1X1 | 10X12 | 8X10 | N/A | 2 |
| 3X3 | 24X24 | 6X6 | 1.5 | 1.5 |
| 3X3 | 32X32 | 8X8 | 2 | 2 |

FIG. 7

INTERCHANGEABLE IMAGE DISPLAY SYSTEM AND METHOD TO CREATE

BACKGROUND OF THE INVENTION

The present invention generally relates to interchangeable image display systems and electronic marketplace methods to create image display system.

Some people may grow tired of photo displays in their homes, or in other areas such as offices, and wish to change them with little effort. Photo displays which are durable, and rugged enough to withstand falls, bumps, and other collisions and use may also be preferred. In addition, photos which do not fade or lose color may be preferred.

As can be seen, there may be an ongoing need to develop photo displays which are rugged, durable, do not lose color, and are easily interchangeable.

SUMMARY OF THE INVENTION

In one aspect of the present invention an interchangeable image display system is disclosed including a rigid hard backboard, one or more rigid hard photo tiles, two or more first polarity magnets, and two or more second polarity magnets. The backboard includes a backboard front side coated with a protective finish and including at least one photo area, and a backboard back side opposite the backboard front side. The one or more rigid hard photo tiles include a photo tile front including an image infused into metal; and a photo tile back. The two or more first polarity magnets are fixedly attached to the back board front side in each photo area in a first pattern. The two or more second polarity magnets are fixedly attached to each of the photo tiles on the photo tile back in a second pattern the mirror image of the first pattern; and the second polarity magnets are attracted, and removeably attachable to the first polarity magnets.

In another aspect of the present invention, an image display system backboard assembly includes a display backboard, two or more first polarity magnets, and two attachment brackets. The display blackboard includes a backboard top; a backboard bottom; a backboard first side; a backboard second side; a backboard back; and a backboard front coated with a protective finish and including one or more photo areas. Each photo area includes a vertical axis dividing the photo area into two portions with identical dimensions; and border areas separating the backboard top, the backboard bottom, the backboard first side, and the backboard second side, from the one or more photo areas. The two or more first polarity magnets are fixedly attached within each photo area in a pattern that forms mirror images on either side of the vertical axis; and are configured to removeably attach to two or more second polarity magnets fixedly attached to a photo tile such that the photo tile covers at least part of the photo area. The two attachment brackets are fixedly attached to the backboard back and configured to hang the backboard assembly in a first position, or a second position ninety degrees rotated from the first position.

In yet another aspect of the present invention, a method for creating an interchangeable image display system including a backboard and at least one photo tile includes sending display signals indicative of backboard preferences and photo tile preferences available for the interchangeable display device system electronically to a customer; and receiving chosen backboard preferences and chosen photo tile preferences electronically from the customer. The method further includes receiving photo tile images to be infused into metallic tiles to form the photo tiles electronically from the customer; and sending the photo tile images and the chosen photo tile preferences electronically to a photo processor. The method further includes receiving the at least one photo tile including the chosen photo tile preferences and the photo tile images from the photo processor; and sending the chosen backboard preferences electronically to a backboard processor. The method further includes receiving the backboard including the chosen backboard preferences from the backboard processor; assembling the interchangeable display device; and sending the interchangeable display device system to the customer.

These and other features, aspects and advantages of the present invention will become better understood with reference to the following drawings, description and claims.

BRIEF DESCRIPTION OF THE DRAWINGS

FIG. 6A is a side view of the second configuration of the interchangeable image display device of FIG. 5 hanging vertically on a wall;

FIG. 6B is a side view of the second configuration of the interchangeable image display device of FIG. 5 hanging horizontally on a wall;

FIG. 7 is a table of exemplary configurations of the interchangeable image display device;

DETAILED DESCRIPTION OF THE INVENTION

Reference will now be made in detail to specific embodiments or features, examples of which are illustrated in the accompanying drawings.

Generally, corresponding or similar reference numbers will be used, when possible, to refer to the same or corresponding parts. Relational terms such as top, bottom, first side, second side, front and back may be used for reference, and are not meant to be limiting.

Individuals and businesses may wish to display photo images in a display which is rugged and will endure falls and bumps without damage. They may also want to change photos in a display in a fast and easy manner. The present disclosure relates to an interchangeable photo display system in which photo tiles are interchangeably attached to a display backboard. The disclosure also relates to a method for creating the photo display system utilizing an electronic marketplace.

Figure 1:
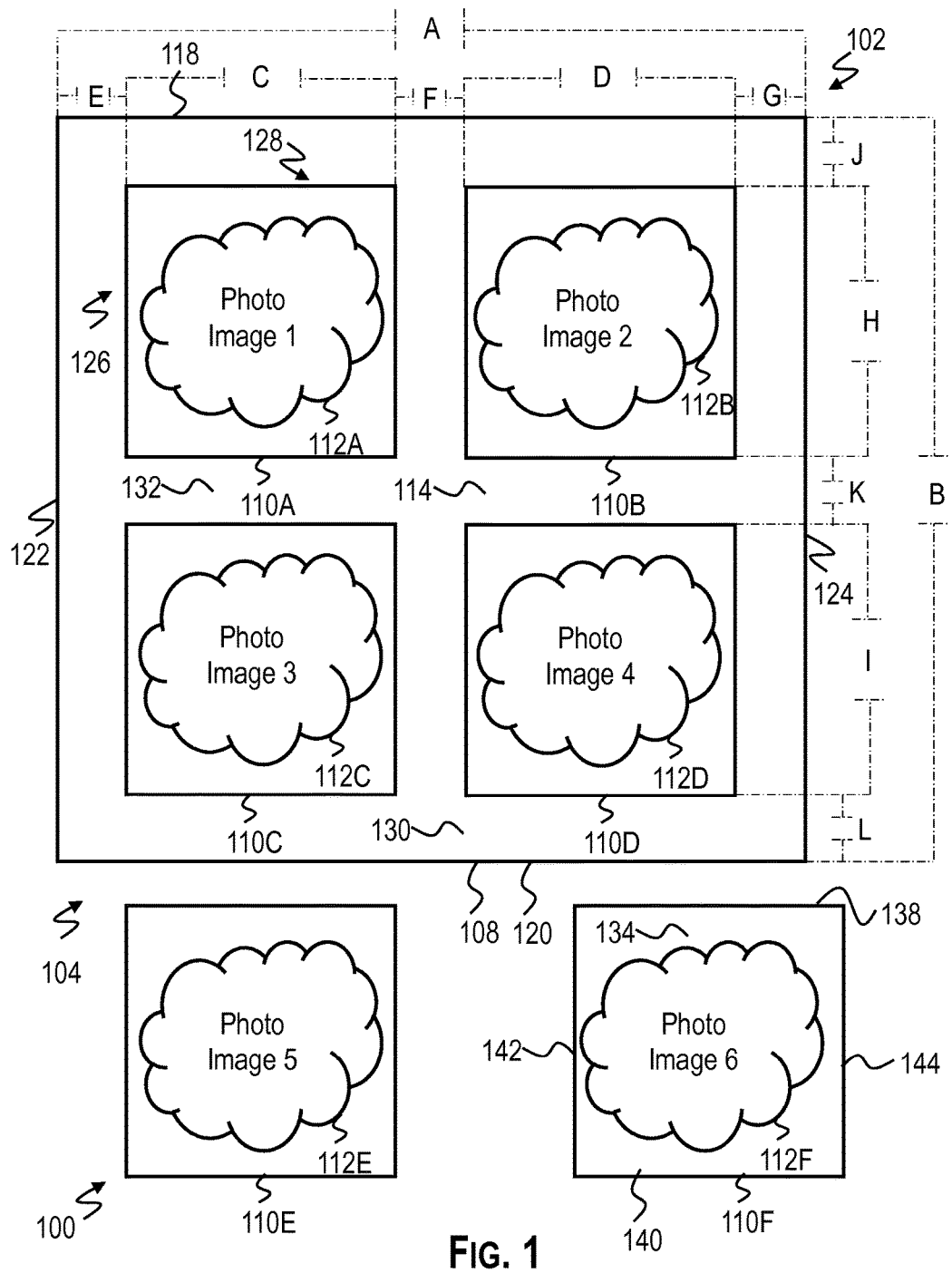
FIG. 1 is a front view of a first configuration of an interchangeable image display device and photo tiles of an interchangeable image display system according to an exemplary embodiment of the present invention.

Referring now to FIG. 1, a front view of a first configuration 104 of an interchangeable image display device 102 and photo tiles 110 of an interchangeable image display system 100 is illustrated. The display device 102 may include a rigid hard display backboard 108 including a backboard front side 114 coated with a protective finish and a backboard back side 116 opposite the backboard front side; and one or more rigid hard photo tiles 110 including a photo tile front 134 including an image 112 infused into metal. Some of the photo tiles 110A-110D may be removeably attached to the display backboard 108, while others of the photo tiles 110E-110F, although configured to be removeably attach to the display backboard 108, may not be currently attached as illustrated. In the first configuration 104 illustrated, the photo tiles 110 removeably attached to the display backboard 108 are arranged in two rows 126, and two columns 128 of square photo tiles 110. Other embodiments may include other configurations and numbers of rows 126 and columns 128, as well as other shapes of photo tiles 110.

The display backboard 108 may include a top side 118 between the front side and the back side; a bottom side 120 between the front side and the back side, and opposite the top side 118; a first side 122 between the front side and the back side, and between the top side 118 and the bottom side; and a second side 124 between the front side and the back side, between the top side and the bottom side, and opposite the first side. Borders 130 may separate the photo tiles 110 from the top side 118, bottom side 120, first side 122 and second side of the display backboard 108. Channels 132 may separate one photo tile 110 from another photo tile 110. The display backboard 108 may be made of metal, for example eight gauge steel. In other embodiments, the display backboard may be made of wood, rigid plastics, or other rigid hard materials or combinations of materials.

The display device 102 may have a width A, and a height B. The width A may have an exemplary range of nine (9) inches to thirty-two (32) inches, and may be twenty-two (22) inches. The width A may vary depending on the desired number of columns 128 of photo tiles 110, the desired dimensions of the photo tiles 110, the desired dimensions of the borders 130, and the desired dimensions of the channels 132. The height B may have an exemplary range of nine (9) inches to thirty-two (32) inches, and may be twenty-two (22) inches. The height B may vary depending on the desired number of rows 126 of photo tiles 110, the desired dimensions of the photo tiles 110, the desired dimensions of the borders 130, and the desired dimensions of the channels 132.

The photo tiles 110 may have widths C and D, and heights H and I. The widths C and D may have an exemplary range of six (6) inches to eight (8) inches, and may be eight (8) inches. Although all the photo tiles 110 are shown with similar widths C and D in the illustrated embodiment, in other embodiments some photo tiles 110 may have different widths C and D. However, the more the widths C and D vary, the less exchangeable the photo tiles 110 will be. The heights H and I may have an exemplary range of six (6) inches to eight (8) inches, and may be eight (8) inches. Although all the photo tiles 110 are shown with similar heights H and I in the illustrated embodiment, in other embodiments some photo tiles 110 may have different H and I. However, the more the H and I vary, the less exchangeable the photo tiles 110 will be.

The borders 130 may have widths E, G, J, and L. The widths E, G, J, and L may have an exemplary range of one and a half (1.5) inches to two (2) inches, and may be two (2) inches. Although all the borders 130 are shown with similar widths E, G, J, and L in the illustrated embodiment, in other embodiments some borders 130 may have different widths E, G, J, and L. The channels 132 may have widths F and K. The widths F and K may have an exemplary range of one and a half (1.5) inches to two (2) inches, and may be two (2) inches. Although all the channels 132 are shown with similar widths F and K in the illustrated embodiment, in other embodiments some channels 132 may have different widths F and K.

In addition to the photo tile front 134, the photo tiles 110 may include a photo tile back 136 (show in relation to FIG. 13), a photo tile top 138, a photo tile bottom 140, a photo tile first side 142, and a photo tile second side 144. In the embodiment illustrated, each photo tile 110 has a different image 112 infused onto the photo tile front 134. For example, photo tile 110A has photo image 112A infused onto the photo tile front 134, photo tile 110B has image 112B infused onto the photo tile front 134, and so on. In other embodiments, some photo tiles 110 may have similar images infused onto the photo tile front 134.

In one embodiment, the photo tile fronts 134 may be coated aluminum and the images 112 may be infused into the photo tile 110 through infusing dyes directly into the aluminum. The photo tiles 110 may have a high gloss, satin, sheer with a glossy finish, or sheer with a matte finish applied to the image 112. The photo tiles 110 may be square as shown in the illustrated embodiment, or they may be different shapes which fit in photo areas 164 (shown in relation to FIG. 8). The corners of the photo tiles 110 may be squared, as illustrated, or may be rounded or formed in a different shape. The photo tile top 138, the photo tile bottom 140, the photo tile first side 142, and the photo tile second side 144 may be flat (as shown in relation to FIGS. 4A, 4B, 6A, and 6B), rounded, or formed in another shape. The photo tile top 138, the photo tile bottom 140, the photo tile first side 142, and the photo tile second side 144 may be colored differently than the photo tile front 134 or photo tile back 136.

The system 100 may include extra photo tiles 110. For example, the system 100 illustrated includes extra tiles 110E and 110F, which can be removeably attached to the display blackboard 108 in place of one of the photo tiles 110A, 110B, 110C, and 110D. Photo tiles 110A, 110B, 110C, and 110D may also be interchanged into different positions on the display backboard 108.

Figure 2:
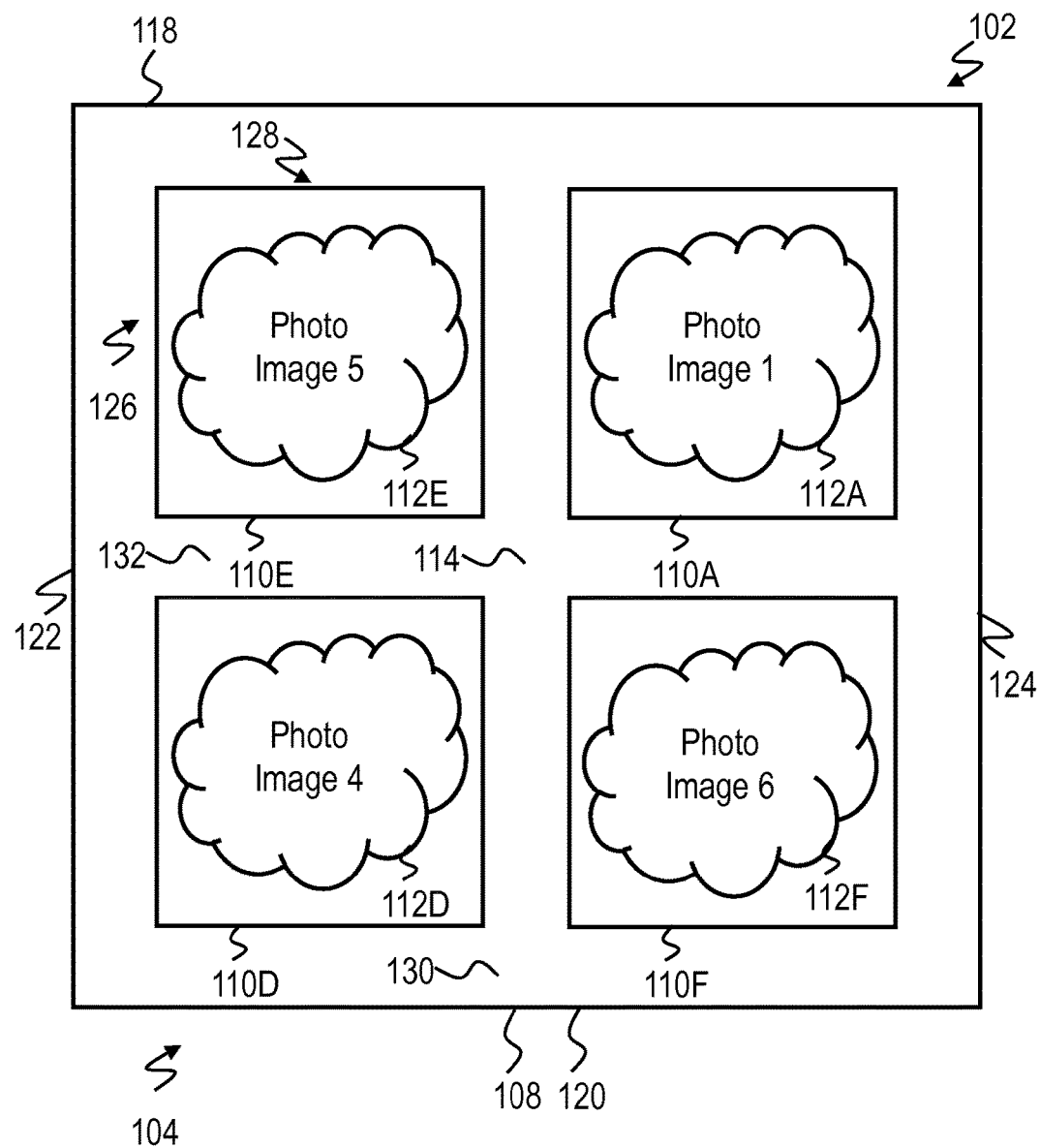
FIG. 2 is a front view of the interchangeable image display device of FIG. 1 with the photo tiles interchanged.

Referring now to FIG. 2, a front view of the interchangeable image display device 102 with photo tiles 110 interchanged and rearranged from FIG. 1 is illustrated. In this example of how photo tiles 110 may be interchanged, the following has been changed in relation to the arrangement of photo tiles 110 in FIG. 1: a) photo tiles 110B and 110C have been removed from the display backboard 108, b) photo tile 110A has been moved to where photo tile 110B was, c) photo tile 110D has been moved to where photo tile 110C was, d) photo tile 110E has been attached to the display backboard where photo tile 110A was, and e) photo tile 110F has been attached to the display backboard where photo tile 110D was. The example of the rearrangement of photo tiles 110 in FIGS. 1 and 2 is meant to be non-limiting. One skilled in the art will realize that many possible arrangements of photo tiles 110 is possible.

Figure 3:
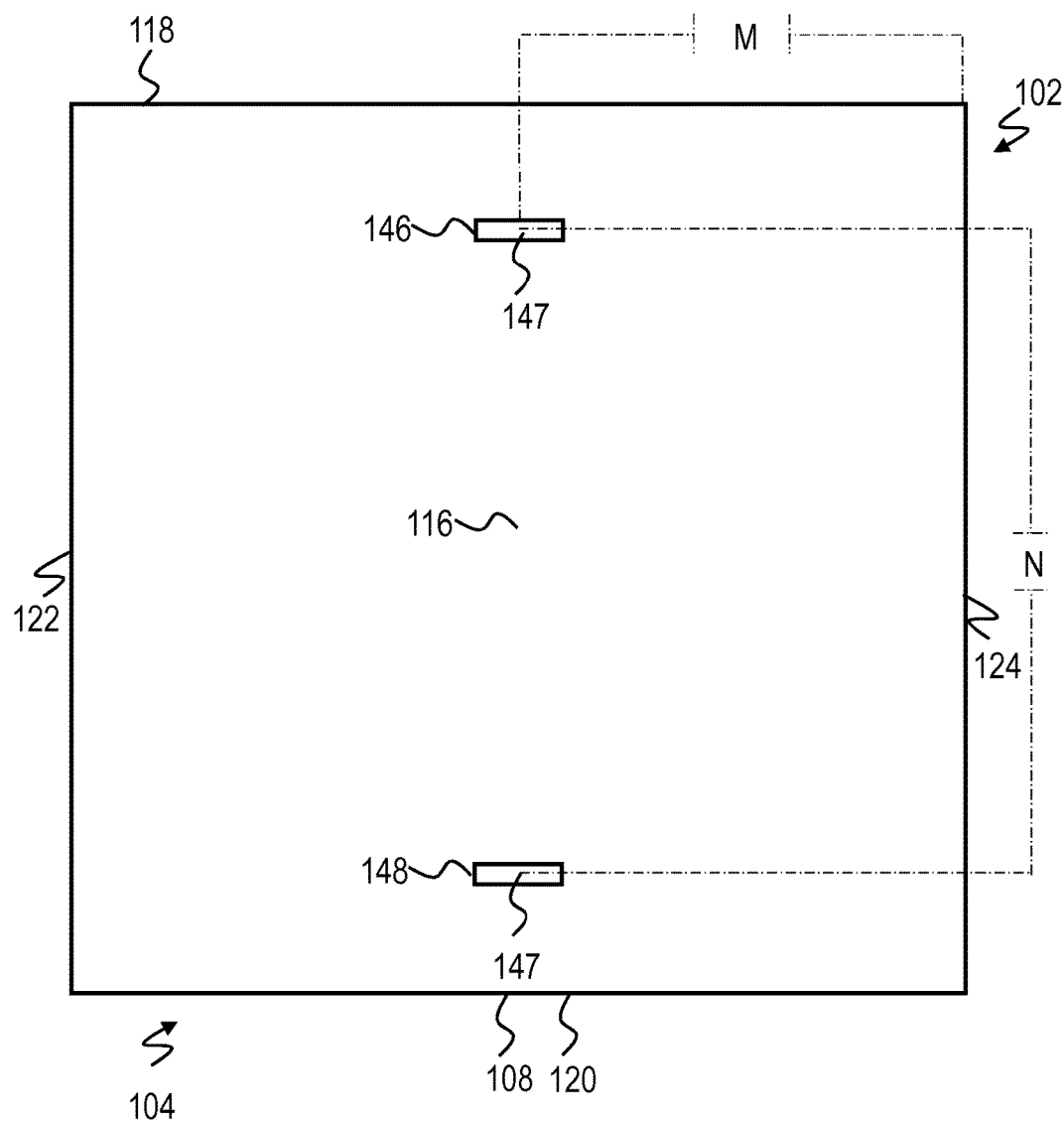
FIG. 3 is a back view of the interchangeable image display device of FIGS. 1 and 2.

Referring now to FIG. 3, a back view of the interchangeable image display device 102 is illustrated. A first hanging device 146 and a second hanging device 148 may be fixedly attached to the backboard back 116 for hanging the display device 102 in a vertical or a horizontal position on a wall 158 (shown and described in more detail in relation to FIGS. 4A and 4B, and 6A and 6B). Each hanging device 146, 148 may include a center 147 which may be a distance M from one of the backboard first side 122 and backboard second side 124. The distance M may be in an exemplary range of four and a half (4.5) inches and sixteen (16) inches. The distance M may be half of the width A of the display device 102. The center 147 of the first hanging device 146 may be a distance N from the center of the second hanging device 148. In many homes, the distance between wall studs is sixteen (16) inches. In an exemplary embodiment, the distance N is approximately sixteen (16) inches to make hanging the display device 102 in a horizontal position convenient. In other embodiments, the distance N may differ, based at least in part on the environment where the display device 102 is to be hung.

Figure 4A:
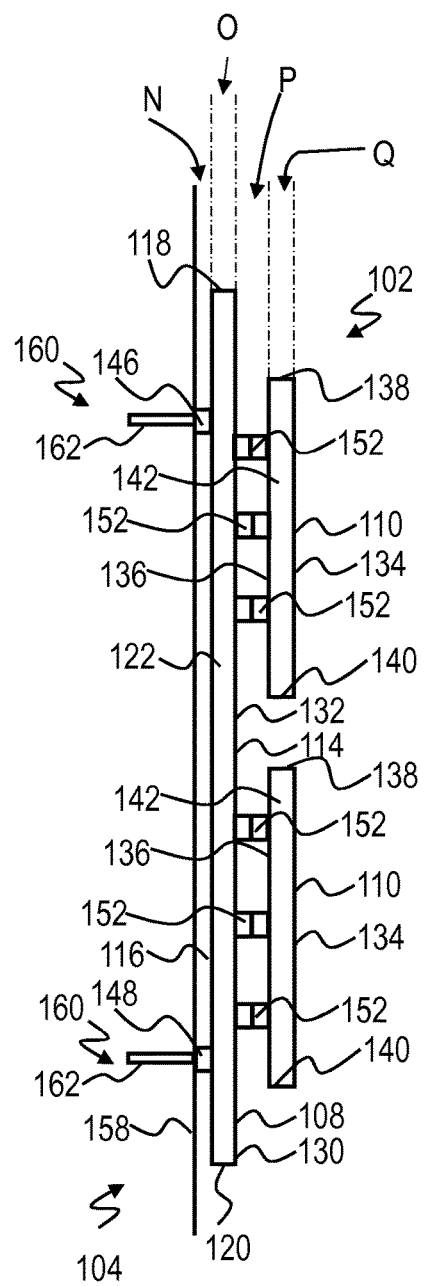
FIG. 4A is a first side view of the interchangeable image display device of FIGS. 1 and 2 hanging vertically on a wall.
Figure 4B:
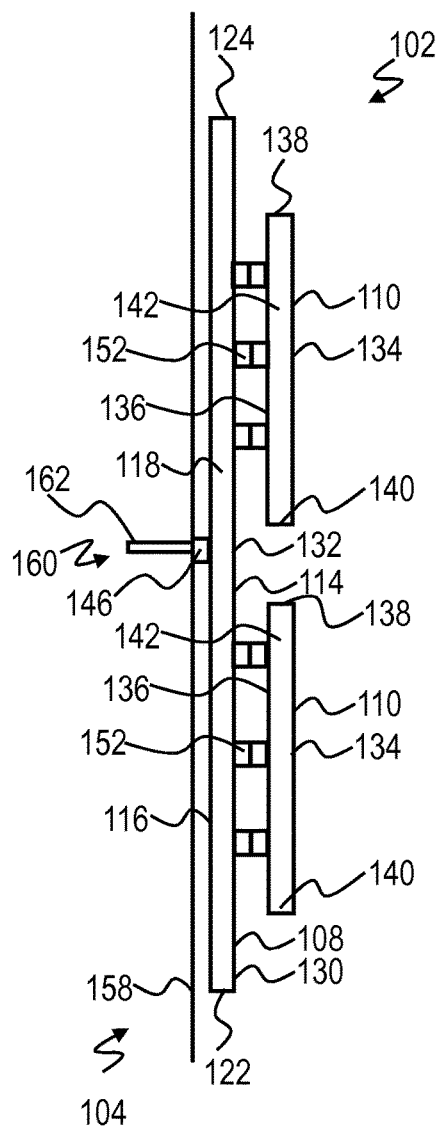
FIG. 4B is a top view of the interchangeable image display device of FIGS. 1 and 2 hanging horizontally on a wall.

Referring now to FIGS. 4A and 4B, side views of the interchangeable image display device 102 are illustrated hanging vertically (in FIG. 4A) and horizontally (in FIG. 4B) on a wall 158. The display backboard 108 may have a display backboard thickness of O. In one example where the display backboard 108 is made from 16 gauge steel, the thickness O may be one thousand nine hundred and forty three ten thousandths (0.1943) inches. In other embodiments the display backboard thickness O may differ, and may be based at least in part on the material the display backboard 108 is made from. The photo tiles 110 may have a photo tile thickness of Q. In one example the thickness Q may be in a range from one tenth (0.1) inch to three tenths (0.3) inch. In other embodiments the photo tile thickness Q may differ.

The photo tiles 110 may be offset from the display backboard 108 by a distance of P. In one embodiment the distance P may be in a range of a half (0.5) inch to one (1) inch, and may be three quarters (0.75) inch. Magnet coupling devices 152, which removeably attach the photo tiles 110 to the display backboard 108, may also offset the photo tiles 110 from the display backboard 108. The magnet coupling devices 152 may optionally include one or more depth magnets 157 which are sandwiched between at least two other magnets. The depth magnets 157 may be removable such that the distance P is adjustable. The display backboard 108 may be offset from the wall 158 by a distance N. In an exemplary embodiment, the distance N may be in a range of two sixteenths (0.125) inch to three sixteenths (0.1875) inch. The first hanging device 146 and the second hanging device 148 may offset the display backboard 108 from the wall 158.

The first hanging device 146 and the second hanging device 148 may interact with a wall hanger 160 to hand the display device 102 on the wall 158. The wall hanger 160 may include a drywall screw 162. The drywall screw 162 may be configured to be driven into a stud of a wall with the head of the drywall screw 162 protruding from the wall 158. The first hanging device 146 and the second hanging device 148 may each interact with the head of a drywall screw to hang the display device from the wall as will be described more fully in relation to FIGS. 10 and 11.

The display backboard 108 may hang on the wall vertically (FIG. 4A) or horizontally (FIG. 4B) depending on the preferences of the owner, customer, or display hanger. Although the appearance may not be that different when the photo tiles 110 are all the same size, and the number of rows 126 is equal to the number of columns (as is the case in the first configuration 104), in some configurations (such as shown in FIGS. 6A and 6B), the appearance can change greatly depending on the orientation the display backboard 108 is hung in. Depending on the structure of the walls in the environment the display device 102 is to be hung, the display device may be more securely hung in one orientation than in another. The configuration of the first hanging device 146 and the second hanging device 148 allow a choice in the orientation the display backboard 108 is hung.

In FIG. 4A, where the display backboard 108 is hung vertically, the backboard first side 122 and the photo tile first side 142 are facing out of the drawing, the backboard top 118 and the photo tile tops 138 are on the top of the display backboard 108 and photo tiles 110 respectively, and the backboard bottom 120 and the photo tiles bottom 140 are on the bottom of the display backboard 108 and photo tiles 110 respectively. In FIG. 4B, the display backboard 108 has been rotated ninety (90) degrees and is hung horizontally. However, the photo tiles 110 may have been removed from the display back board 108 and reattached in a different orientation to the display backboard 108, to maintain the proper orientation of the image 112 in relation to a viewer. Thus in the horizontal position, the backboard top 118 and the photo tile first side 142 are facing out of the drawing, the backboard second side 124 and the photo tile tops 138 are on the top of the display backboard 108 and photo tiles 110 respectively, and the backboard first side 122 and the photo tiles bottom 120 are on the bottom of the display backboard 108 and photo tiles 110 respectively.

Figure 5:
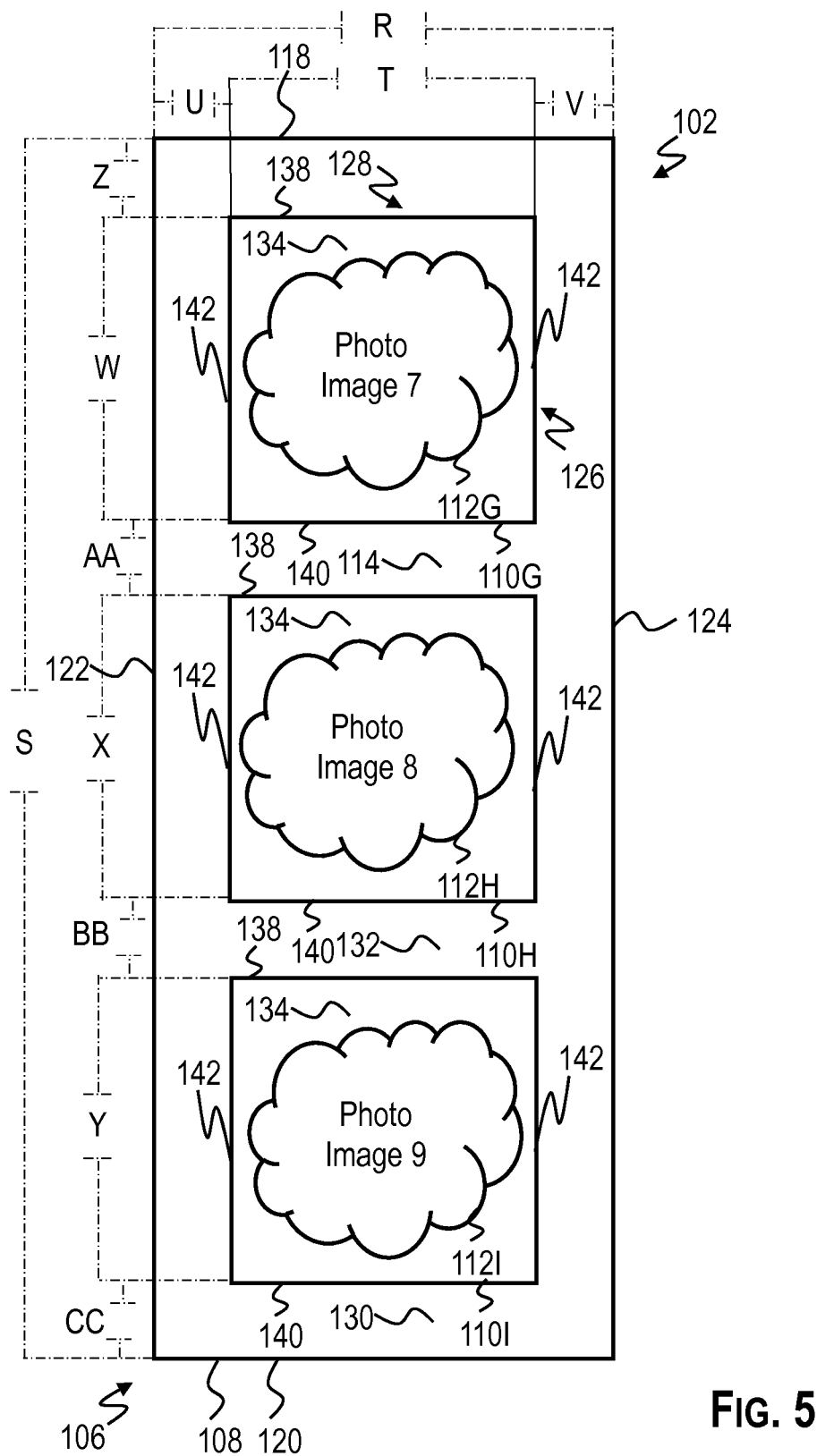
FIG. 5 is a front view of a second configuration of the interchangeable image display device according to an exemplary embodiment of the present invention.

Referring now to FIG. 5, a front view of a second configuration 106 of the interchangeable image display device 102 is illustrated. In the second configuration the display device 102 includes three (3) rows 126 and one (1) column 128. The display backboard has a width R, which may be nine (9) inches, and a height S, which may be twenty-four (24) inches. The photo tiles 110 have width T, which may be six (6) inches; and heights W, X, and Y which may be six (6) inches. The borders 130 have a widths of U, V, Z, and CC, which may be one and a half (1.5) inches. The channels 132 have a width of AA and BB, one and a half (1.5) inches.

Referring now to FIGS. 6A and 6B, side views of the second configuration 106 of the interchangeable image display device 102 are illustrated hanging vertically (in FIG. 6A) and horizontally (in FIG. 6B) on a wall 158. Elements are similar to those in FIGS. 4A and 4B, and are numbered similar to those in 4A and 4B, and will not be further described.

In the second configuration 106 of the display device 102, the choice of whether to hang the display backboard 108 vertically or horizontally, may be based on aesthetics, available space size and shape, physical environment, or other factors. As the second configuration 106 has more rows than columns the appearance in different orientation may be quite different. In the second configuration 106 of the display device 102, depth magnets 157 are not illustrated, but could be inserted.

Referring now to FIG. 7, a table of exemplary configurations of the interchangeable image display device 102 is illustrated. The non-limiting examples listed in the table include the configuration of rows 126 and columns 128; The display backboard 108 width and height dimensions (AXB in FIG. 1, or RXS in FIG. 5); photo tile 110 width and height dimensions (FIG. 1: CXH, DXH, CXI, DXI; FIG. 5: TXW, T by X, TXY); border 130 widths (FIG. 1: E, G, J, L; FIG. 5: U, V, Z, CC); and channel 132 widths (FIG. 1: F, K; FIG. 5: AA, BB). The dimensions listed are not meant to be limiting, and those skilled in art will realize that many other embodiments exist.

Figure 8:
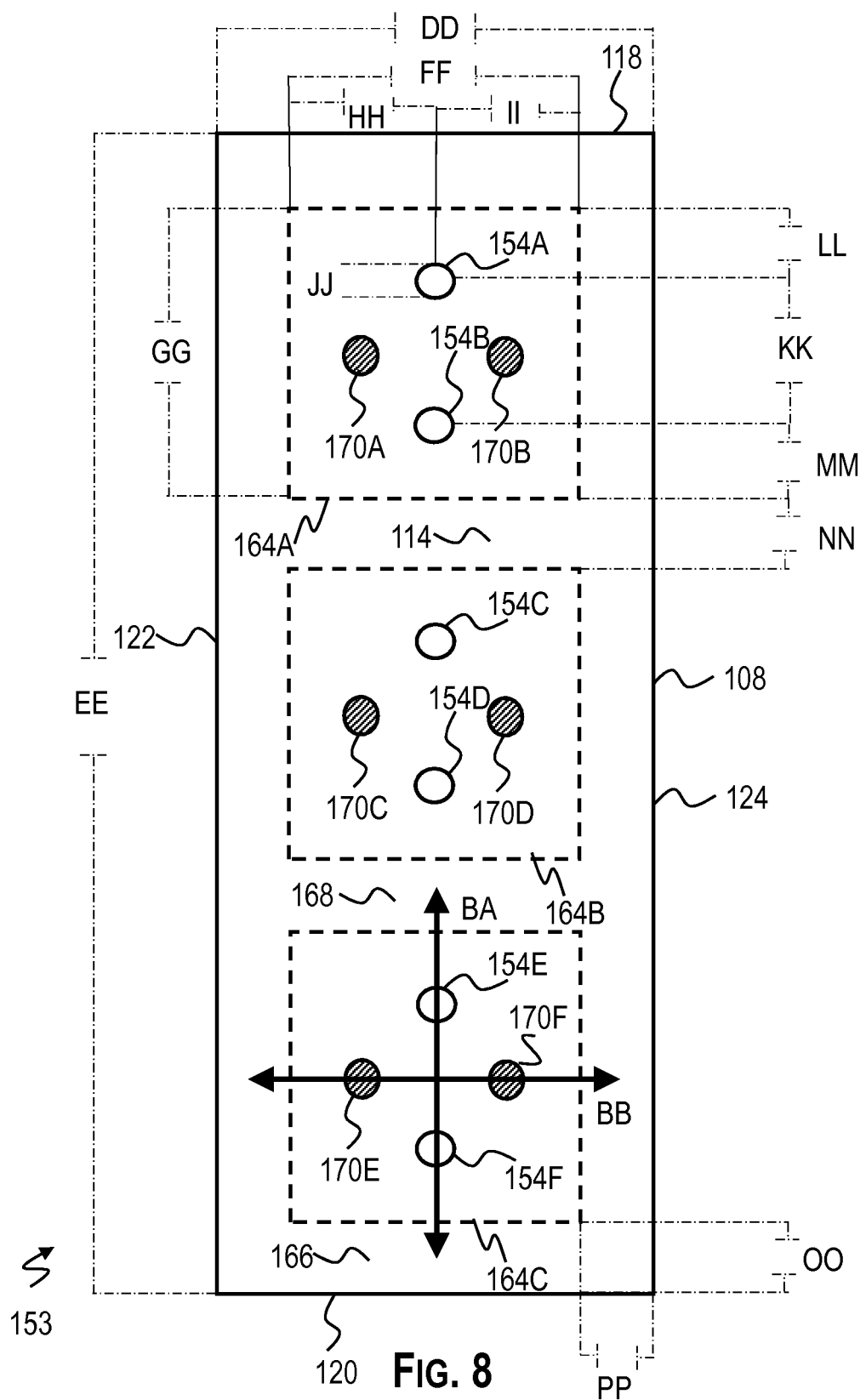
FIG. 8 is a front view of a interchangeable image display device backboard assembly according to an exemplary embodiment of the present invention.

Referring now to FIG. 8, a front view of a display backboard assembly 153 is illustrated. The embodiment of the backboard assembly 153 illustrated is suited for the second configuration of the display device 102, but may be suited for other configurations as well. The display backboard assembly 153 includes the display backboard 108 including the backboard front 114, the backboard back 116, the backboard top 118, the backboard bottom 120, the backboard first side 122, and the backboard second side 124. The backboard front 114 is coated with a protective finish and includes one or more photo areas 164. Each photo area 164 includes a vertical axis BA dividing the photo area 164 into two portions with identical dimensions. The backboard front 114 also includes border areas 166 separating the backboard top 118, the backboard bottom 120, the backboard first side 122, and the backboard second side 124, from the one or more photo areas 164. Two or more first polarity magnets 154 are fixedly attached within each photo area 164 in a pattern that forms mirror images on either side of the vertical axis BA. The first polarity magnets 154 are configured to removeably attach to two or more second polarity magnets 156 fixedly attached to a photo tile 110 such that the photo tile 110 covers at least part of the photo area 164. The two or more first polarity magnets 154 may be arranged in a first pattern in the photo area 164, and may be configured to removeably attach to the two or more second polarity magnets 156 arranged in a second pattern which is the mirror image of the first pattern and fixedly attached to the photo tile back 136.

In the embodiment illustrated, two first polarity magnets 154A and 154B are illustrated in the center of the vertical axis BA of each photo area. In some embodiments, these will be the only first polarity magnets 154 fixedly attached to the photo areas 164. In these embodiments, photo tiles 110 with only two second polarity magnets 156 will have to be manufactured for hanging the display backboard 108 to the wall 158 in a particular orientation. However, some embodiments of the display device 108 may include additional first polarity magnets 154 in alternative magnet positions 170. In the embodiment illustrated the additional first polarity magnets 154 are arranged in a third pattern which forms a mirror image on both sides of a horizontal axis BB which divides the photo area 164 into two equal halves. When these additional first polarity magnets are fixedly attached in the photo area 164, a photo tile 110 with second polarity magnets in the second pattern will removeably attach to the display backboard 108 in the same viewing position in relation to a viewer, whether the display backboard is hung in a vertical orientation or a horizontal orientation.

In one embodiment, the first polarity magnets 154 may be circular magnets with a diameter JJ. The diameter JJ may be three quarters (0.75) inch. The first polarity magnets 154 may have a thickness of three eighths (0.375) inch. In other embodiments the first polarity magnets 154 may be different shapes, sizes, and thicknesses. Generally the size, shape, and number of first polarity magnets 154 should be designed at least in part based on the weight and size of the photo tiles 110 to be attached with the second polarity magnets 156. The thickness of the first polarity magnets 154 should be designed to separate the photo tiles 110 from the display backboard 108 a desired distance. In one embodiment, the first polarity magnets 154 are fixedly attached to the photo area 164 with an epoxy adhesive. However, other adhesives, such as gorilla Glue® are contemplated, as well as other methods of attachment, such as tape or other material with adhesive on both sides.

The display backboard 108 may have a width DD and a height EE. The width DD and height EE may be similar to the dimensions of the display device (A and B) and may be in the same ranges. The photo areas 164 may have a width FF and a height GG. The width FF may be in a range of six (6) inches to eight (8) inches, and me be six (6) inches. The height GG may be in a range of six (6) inches to ten (10) inches, and may be six (6) inches. The dimensions of photo tiles 110 which may be removeably attached to the display backboard 108 may be similar to the dimensions of the photo area 164 when the photo tiles 110 are square. However, when the photo tiles 110 are different shapes the dimensions may be different from the photo area 164.

In the illustrated embodiment, including two first polarity magnets 154 in a first pattern creating a mirror image on either sides of the vertical axis BA, the center of the first polarity magnets 154 in at least one of the photo areas 164 may be a distance of HH from one side of the photo area 164, and a distance of II from the other side of the photo area 164. The distance HH may be in a range of three (3) inches to four (4) inches, may be three (3) inches, and may be half of the width FF. The distance II may be in a range of three (3) inches to four (4) inches, may be three (3) inches, and may be half of the width FF.

The center of one of the first polarity magnets 154 in at least one of the photo areas 164 may be a distance of LL from the top of the photo area 164. The distance LL may be in a range of one and a half (1.5) inches to two and a half (2.5) inches, may be one and a half (1.5) inches, and may be a quarter of the height GG. The center of the other first polarity magnet 154 may be a distance of MM from the bottom of the photo area 164. The distance MM may be in a range of one and a half (1.5) inches to two and a half (2.5) inches, may be one and a half (1.5) inches, and may be a quarter of the height GG. The centers of the two first polarity magnets 154 may be a distance of KK from each other. The distance KK may be in a range of three (3) inches to five (5) inches, may be three (3) inches, and may be half of the height GG.

The border areas 166 may have a widths of NN or PP. The widths NN and PP may be in the range of one and a half (1.5) inches to two (2) inches, may be one and a half (1.5) inches, and may be one sixth of the width DD, or one sixteenth of the height EE. The display backboard 108 may include channel areas 168 between the photo areas 164. The channel areas 166 may have a width NN. The width NN may be in the range of one and a half (1.5) inches to two (2) inches, may be one and a half (1.5) inches, and may be one sixteenth of the height EE.

The first polarity magnets 154 may be fixedly attached to the photo area 164 using a pattern (not shown). The pattern may be made of a rigid material such as wood. The pattern may have the same width DD and height EE as the display backboard 108. The pattern may have apertures with centers in a similar location in relation with the edges of the pattern, as the first polarity magnets 154 centers have with the edges of the backboard front 114. The apertures may be a similar shape as the first polarity magnets 154, but may be a small defined amount larger. The pattern may be placed on the display backboard 108 with the edges flush with the display backboard 108 edges. Epoxy or a different adhesive may be applied to the display backboard 108 through the apertures, and/or the first polarity magnets 154. The first polarity magnets 154 may be placed in the apertures and left until the epoxy or other adhesive sets. The pattern may be removed after the first polarity magnets 154 are placed in the apertures.

The backboard front 114, and in some embodiments one or more of the backboard back 116, the backboard top 118, the backboard bottom 120, the backboard first side 122, and the backboard second side 124 may be coated with a protective finish. If the display backboard 108 is made of metal, the protective finish may be a powdered paint finish which was applied as a free-flowing, dry powder. The powder may have been applied electrostatically and then cured under heat. The powder may be a thermoplastic or a thermoset polymer, and the powdered paint finish may be tougher than conventional paint. If the display backboard 108 is made of wood, the protective finish may be a polyurethane or other wood protective finish. If the display backboard 108 is made of a rigid plastic, the protective finish may be the powdered paint finish similar to a metal display backboard 108. The type of protective finish may be based on ensuring that typical household falls and bumps will not damage the display backboard 108.

Figure 9:
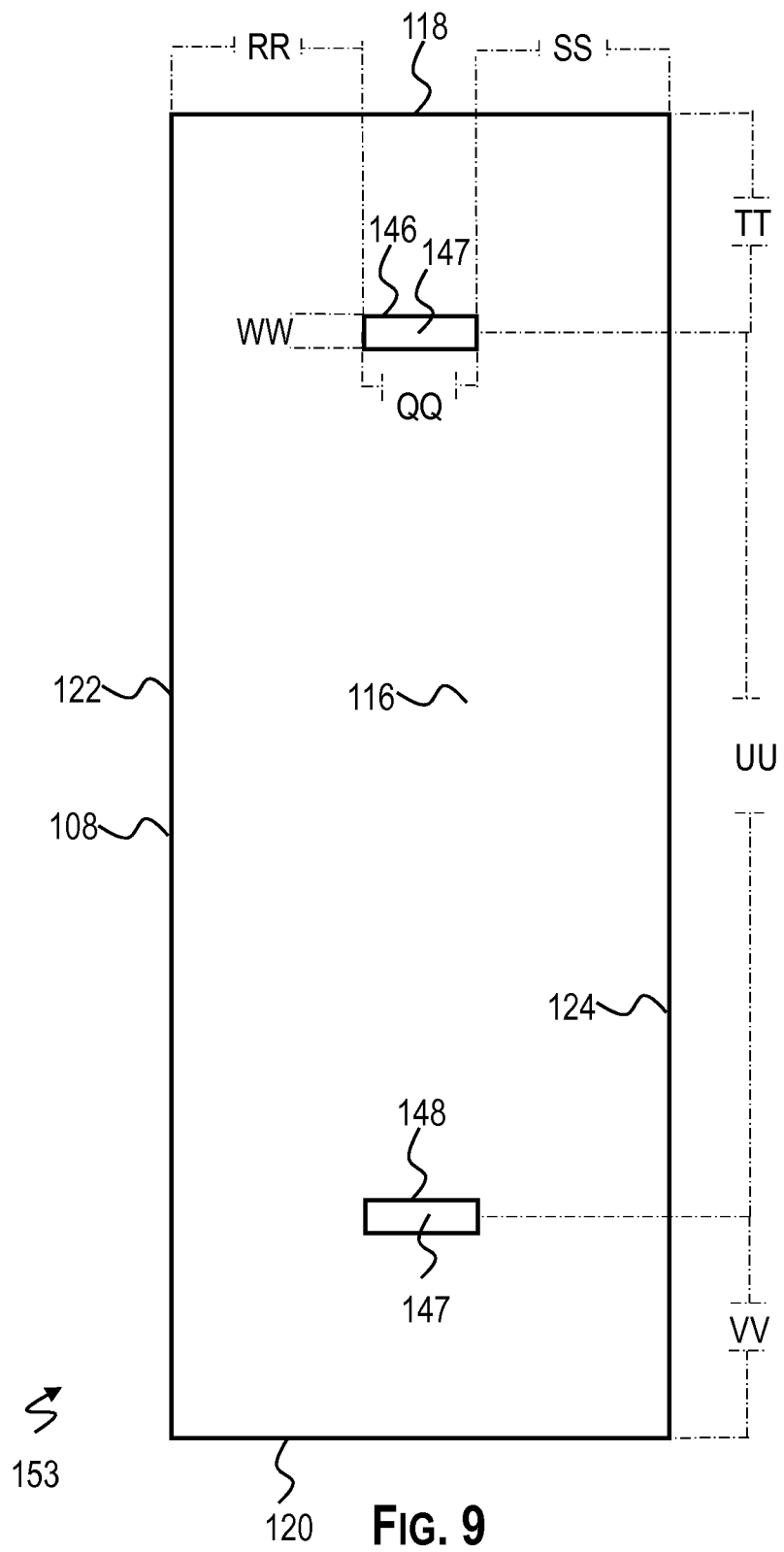
FIG. 9 is a back view of the interchangeable image display device backboard assembly of FIG. 8.

Referring now to FIG. 9, a back view of the interchangeable image display device backboard assembly 153 is illustrated. In the illustrated embodiment, the first hanging device 146 and the second hanging device 148 are fixedly attached to the backboard back 116 and configured to hang the display backboard assembly 153 in a first position, or a second position ninety degrees rotated from the first position. In one embodiment the first hanging device 146 and the second hanging device 148 are two attachment brackets 150 (shown in FIGS. 10 and 11).

The centers 147 of the first hanging device 146 and the second hanging device 148 may be a distance of UU apart. The distance UU may be sixteen (16) inches. In many homes and buildings, wall studs are sixteen (16) inches apart. If distance UU is sixteen (16) inches, and when the display device 102 is hung in one orientation, each hanging device 146, 148 may removeably attach to a wall hanger 160 attached to a stud. Depending on the construction of the environment the display device 102 is to be hung, and the dimensions of the display device 102, distance UU may have other values. For example, if the height EE of the display backboard 108 is less than twenty (20) inches, distance UU may be less than sixteen (16) inches.

The center 147 of the first hanging device 146 may be distance TT from the backboard top 118. Distance TT may be in the range of one (1) inch to eight (8) inches, and may be four (4) inches in the illustrated embodiment. The center 147 of the second hanging device 148 may be distance VV from the backboard bottom 120. Distance VV may be in the range of one (1) inch to eight (8) inches, may be four (4) inches in the illustrated embodiment, and may be equal to distance TT. One side of the first and second hanging devices 146, 148 may be a distance RR from the backboard first side 122. Distance RR may be in the range of three (3) inches to fourteen and a half (14.5) inches, and may be three (3) inches in the illustrated embodiment. The other side of the first and second hanging devices 146, 148 may be a distance SS from the backboard second side 124. Distance SS may be in the range of three (3) inches to fourteen and a half (14.5) inches, may be three (3) inches in the illustrated embodiment, and may be equal to distance RR.

Figure 10:
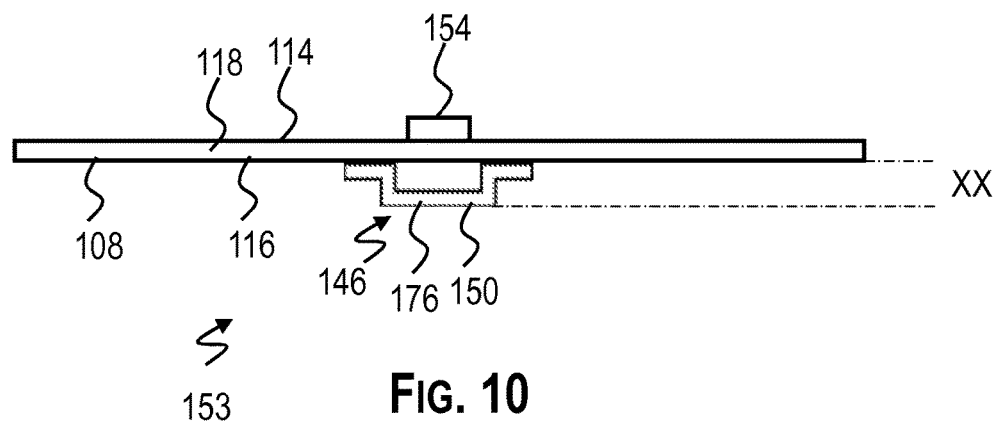
FIG. 10 is a top view of the interchangeable image display device backboard assembly of FIG. 8.

Referring now to FIG. 10, a top view of the interchangeable image display device backboard assembly 153 is illustrated. In the embodiment illustrated, the hanging devices 146, 148 are a brackets 150. The bracket 150 shown may have a wall attachment portion 176, the top of which is a distance XX from the backboard back 118. Distance XX may be in the range of one eighth (0.125) inch to one fourth (0.25) inch, and in the embodiment illustrated may be three sixteenths (0.375) inch.

Figure 11:
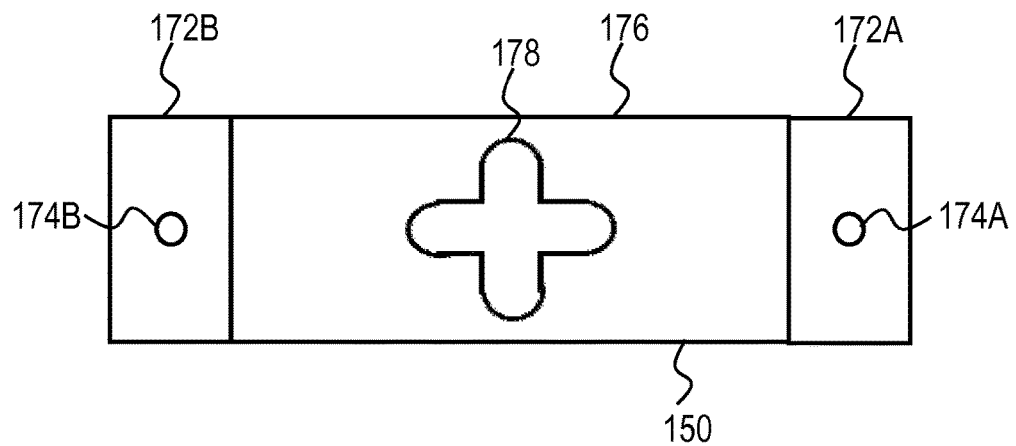
FIG. 11 is a front view of a bracket according to an exemplary embodiment of the present invention.

Referring now to FIG. 11, a front view of the bracket 150 is illustrated. The bracket 150 may include the wall attachment portion 176, one or more device attachment portions 172, and an aperture 178. The bracket 150 may be made from a flat rectangular piece of steel or other metal. The steel or other metal may, for example be sixteen (16) gauge. The piece of steel may be bent or otherwise formed such that the wall attachment portion 176 is displaced from the device attachment portions. The device attachment portions 172 may be fixedly attached to the backboard back 118. When the display backboard 108 is made of metal, the device attachments may be attached with spot welds 174 as shown in the illustrated embodiment. However, other means of attachment such as, for example, nails, screws, and adhesives may be used. The means of attachment may vary depending on the material the display backboard 108 is made of.

The aperture 178 may be formed in a shape such that a drywall screw 162 head may be slipped through the aperture and into the space between the bracket 150 and the backboard back 118 to hold the display device 102 on the wall 158. The aperture 178 may be formed to allow hanging on a drywall screw 162 in a vertical or horizontal orientation. For example the aperture 178 may be in the form of a cross, and may be similar to the aperture 178 in the illustrated embodiment.

Figure 12:
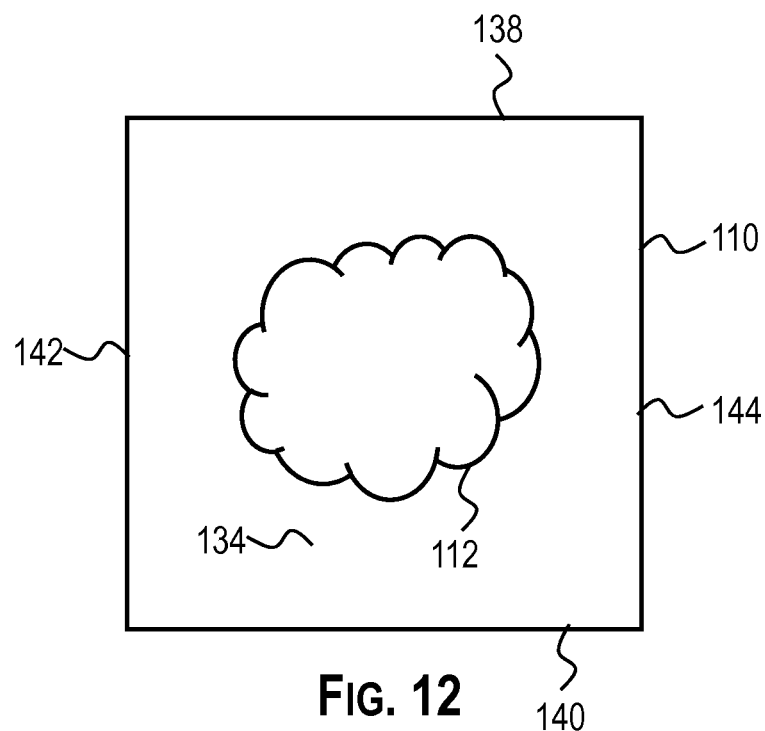
FIG. 12 is a front view of a photo tile according to an exemplary embodiment of the present invention.
Figure 13:
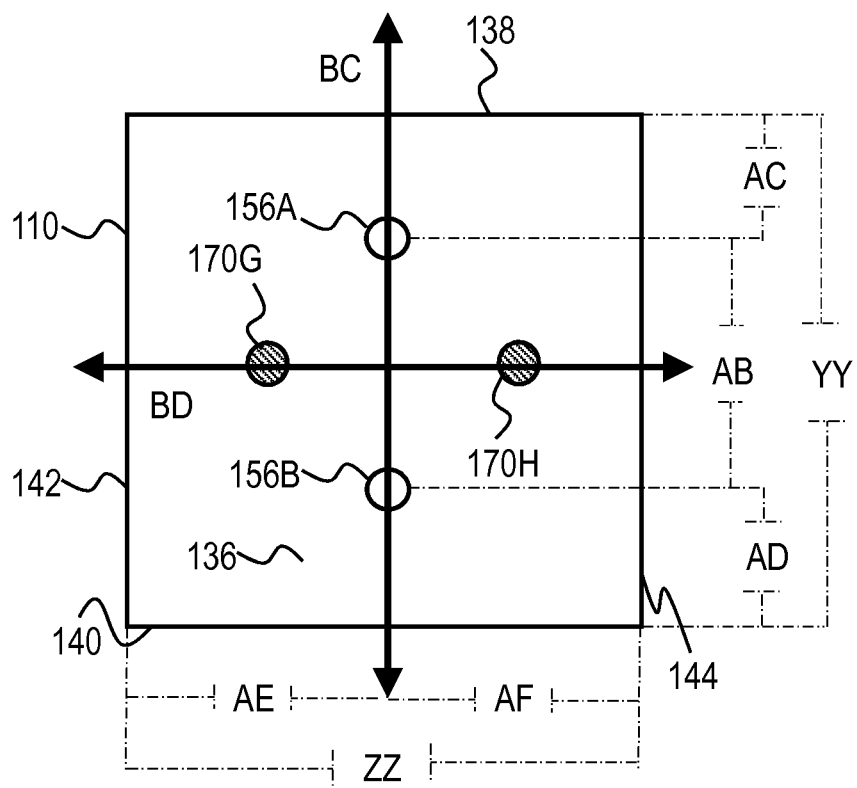
FIG. 13 is a back view of the photo tile of FIG. 12.

Referring now to FIGS. 12 and 13, a front view and back view of one of the photo tiles 110 is illustrated. In the illustrated embodiment, the photo tile 110 is square and has a width of ZZ and a height of YY. The width ZZ may be in a range of six (6) inches to eight (8) inches, and may be six (6) inches in the embodiment illustrated. The width YY may be in a range of six (6) inches to eight (8) inches, and may be six (6) inches in the embodiment illustrated. In other embodiments, the photo tile 110 may have another shape, such as for example, a rectangle, ellipse, circle, triangle, cloud, heart or other shape. The shape could also be custom designed for a particular image 112. The shape of the photo tile 110 may accommodate the second pattern of second polarity magnets 156.

The photo tile back 136 includes a vertical axis BC dividing the photo tile back 136 into two portions with may have identical dimensions when the photo tile 110 shape is symmetrical. Two or more second polarity magnets 156 are fixedly attached to the photo tile back 136 in a pattern that forms mirror images on either side of the vertical axis BC. The second polarity magnets 156 are configured to removeably attach to two or more first polarity magnets 154 fixedly attached to a photo area 164 such that the photo tile 110 covers at least part of the photo area 164. The two or more second polarity magnets 156 may be arranged in a second pattern on the photo tile back 136, and may be configured to removeably attach to the two or more first polarity magnets 154 arranged in a first pattern which is the mirror image of the second pattern and fixedly attached to the photo area 164.

In the embodiment illustrated, two second polarity magnets 156A and 156B are illustrated in the center of the vertical axis BC of the photo tile back 136. In some embodiments, these will be the only second polarity magnets 156 fixedly attached to the photo tile back 136. In these embodiments, the display back board 108 including photo areas 164 with only two first polarity magnets 154 will have to be manufactured for hanging the display backboard 108 to the wall 158 in a particular orientation. However, some embodiments of the photo tiles 110 may include additional second polarity magnets 156 in alternative magnet positions 170. In the embodiment illustrated the additional second polarity magnets 156 are arranged in a fourth pattern which forms a mirror image on both sides of a horizontal axis BD which divides the photo tile back 136 illustrated into two equal halves. In some non-symmetrically shaped photo tiles 110 this will not be the case. When these additional second polarity magnets are fixedly attached to the photo tile back 136, the photo tile 110 will removeably attach to a display backboard 108 including photo areas 164 with first polarity magnets 154 in the first pattern in the same viewing position in relation to a viewer, whether the display backboard 108 is hung in a vertical orientation or a horizontal orientation.

In one embodiment, the second polarity magnets 156 may be circular magnets with the diameter JJ (similar to the illustrated first polarity magnets 154 in FIG. 8). The second polarity magnets 156 may have a thickness of three eighths (0.375) inch. In other embodiments the second polarity magnets 156 may be different shapes, sizes, and thicknesses. Generally the size, shape, and number of second polarity magnets 156 should be designed at least in part based on the weight and size of the photo tiles 110. The thickness of the second polarity magnets 156 should be designed to separate the photo tiles 110 from the display backboard 108 a desired distance. In one embodiment, the second polarity magnets 156 are fixedly attached to the photo area 164 with an epoxy adhesive. However, other adhesives, such as gorilla Glue® are contemplated, as well as other methods of attachment, such as tape or other material with adhesive on both sides.

In the illustrated embodiment, including two second polarity magnets 156 in a second pattern creating a mirror image on either sides of the vertical axis BC, the center of the second polarity magnets 156 may be a distance of AE from the photo tile first side 142, and a distance of AF from the photo tile second side 144. The distance AE may be in a range of three (3) inches to four (4) inches, may be three (3) inches in the illustrated embodiment, and may be half of the width ZZ. The distance AF may be in a range of three (3) inches to four (4) inches, may be three (3) inches in the illustrated embodiment, and may be half of the width ZZ.

The center of one of the second polarity magnets 156 may be a distance of AC from the photo tile top 138. The distance AC may be in a range of one and a half (1.5) inches to two and a half (2.5) inches, may be one and a half (1.5) inches in the illustrated embodiment, and may be a quarter of the height YY. The center of the other second polarity magnet 156 may be a distance of AD from the photo tile bottom 140. The distance AD may be in a range of one and a half (1.5) inches to two and a half (2.5) inches, may be one and a half (1.5) inches in the illustrated embodiment, and may be a quarter of the height YY. The centers of the two second polarity magnets 156 may be a distance of AB from each other. The distance AB may be in a range of three (3) inches to five (5) inches, may be three (3) inches in the illustrated embodiment, and may be half of the height YY.

The second polarity magnets 156 may be fixedly attached to the photo back 136 using a pattern (not shown). The pattern may be made of a rigid material such as wood. The pattern may have the same width ZZ and height YY as the photo tile 110. The pattern may have apertures with centers in a similar location in relation with the edges of the pattern, as the second polarity magnet 156 centers have with the edges of the photo tile back 136. The apertures may be a similar shape as the second polarity magnets 156, but may be a small defined amount larger. The pattern may be placed on the photo tile back 136 with the edges flush with the photo tile 110 edges. Epoxy or a different adhesive may be applied to the photo tile back 136 through the apertures, and/or the second polarity magnets 156. The second polarity magnets 156 may be placed in the apertures and left until the epoxy or other adhesive sets. The pattern may be removed after the second polarity magnets 156 are placed in the apertures.

Figure 14:
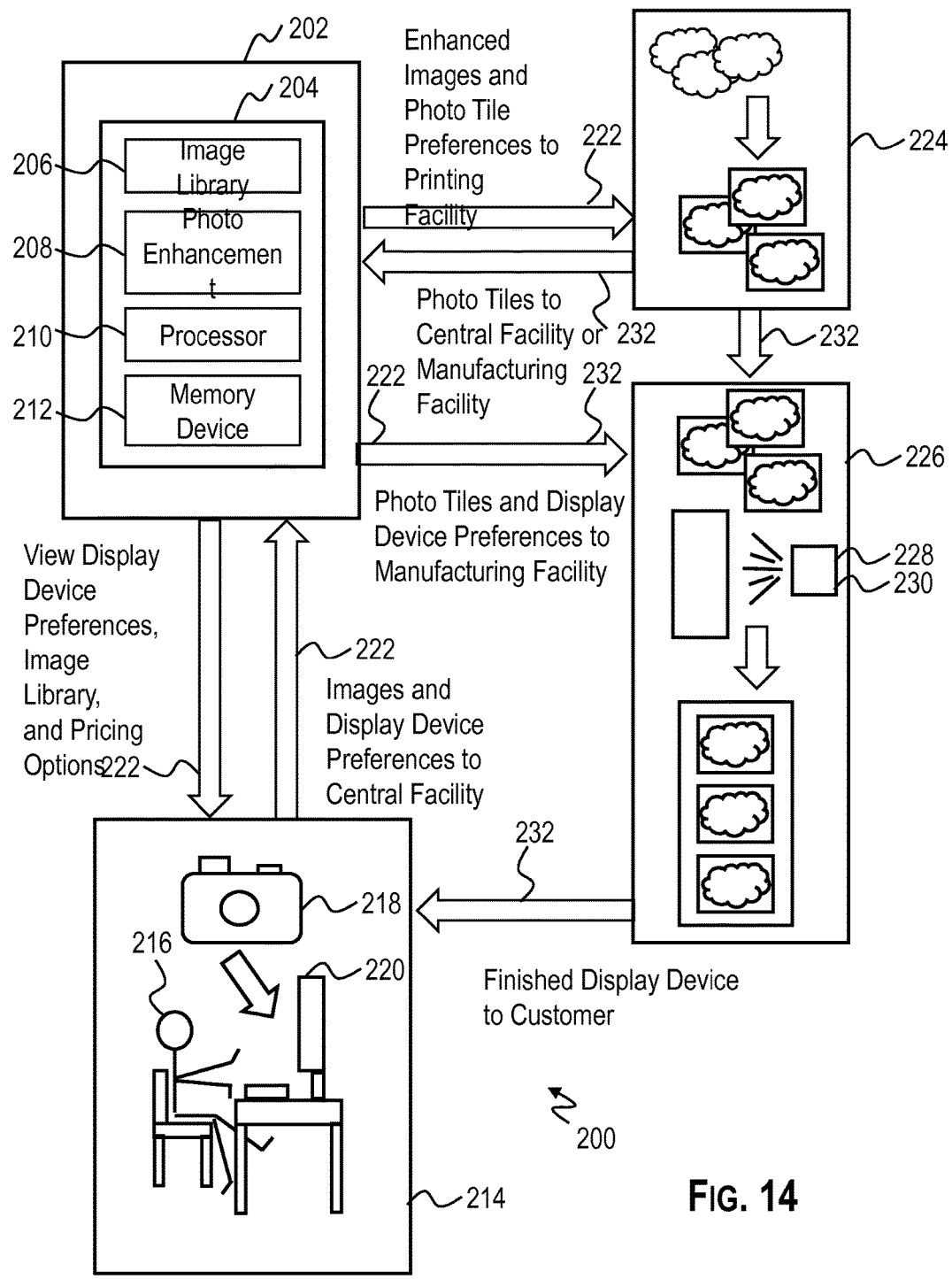
FIG. 14 is a schematic depicting an electronic marketplace system for creating an interchangeable image display system according to an exemplary embodiment of the present invention.

Referring now to FIG. 14, an electronic marketplace system 200 for creating an interchangeable image display system 100 is illustrated in a schematic. The system 200 may include a central facility 202, a customer location 214, a photo processing and printing facility 224, and a manufacturing facility 226. Although illustrated and from here on described as one location, all of the facilities 202, 214, 224, and 226 may in reality be combinations of portions of several separate facilities at different locations, each of which includes functions described in relation to the single facility 202, 214, 224, and 226. Portions or the whole of two or more of the facilities 202, 214, 224, and 226 may be in the same location, although described as two separate facilities.

The central facility 202 may include a computer 204. The computer may contain a processor 210, a memory device 212, photo enhancement software 208, and an image library 206. Although depicted as one computer, the computer 204, may be a combination of multiple computers and/or servers communicatively linked, and each of the separate computers and/or servers may have additional processors and/or memory devices. A person may sit at a single computer interface and through that single computer interface be accessing other computers communicatively connected. Such systems are well known to those skilled in the art.

The image library 206 may include multiple photographic and other library images taken by one or more artists. These artists may be willing to allow the copying and processing into images on photo tiles 110 of the library images for an agreed upon fee or other business arrangement.

The memory device 212 may include data files indicative of available preferences for an interchangeable display device system 100. The preferences may include display device configurations including the number and configuration of photo tiles 110, border 130 width, and channel 132 width. The preferences may also include display backboard 108 material, protective finish, size, and first polarity magnet 154 pattern options. The preferences may also include photo tile 110 size, shape, finish, and second polarity magnet 156 options. Preferences on whether customer wishes to provide their own images or use library images may be included. The memory device may also include business arrangements for preferences a customer may choose such as pricing and copyright agreement restrictions. The memory device 212 may also include code which is executable by the processor 210 to send display signals to a customer interface indicative of display device system 100 preferences. The processor 212 may execute code from the memory device to send signals indicative of one or more interactive displays to a customer location 214 through a communication link 222.

A customer 216 may desire to have an interchangeable display device 100 produced with customer images the customer 216 has taken with a camera 218. The customer 216 may download the customer images from the camera 218 into a computer 220. The computer 220 may receive display signals from the computer 204 and display possible preferences for a display system 100. This may be done, for example, through an Internet site. The customer 216 may choose preferences for the display system 100 and either upload customer images for making photo tiles 110, or choose library images for the photo tiles 110. The customer 216 may then conduct a business transaction over the computer to order the display system 100.

The customer or library images, and the display system 100 preferences the customer 216 has chosen, along with information on the business transaction may be relayed to the computer 204 at the central facility 202. The central facility may do color enhancement, tone enhancement, crop, or otherwise enhance any customer images which have been sent with the photo enhancement software 208 to form enhanced images. The enhanced images and photo tile 110 preferences may be sent to the photo processing and printing facility 224 through a communication link 222. The photo processing and printing facility 224 may create the photo tiles 110 ordered by the customer 216 and ship them to either the central facility 202 or the manufacturing facility 226 through a shipping link 232. The shipping link may include US mail, or any other carrier.

The manufacturing facility 226 may receive the display backboard 108 preferences from the central facility 204 via a communication link 222. The manufacturing facility 226 may produce the display backboard 108 per the preferences received. This may include applying a finish 228, for example a powdered paint finish 230. The manufacturing facility 226 may also attach the hanging devices 146, 148 and/or the first polarity magnets 154 to the display backboard, or the manufacturing facility 226 may ship the unfinished display backboard 108 to the central facility 202 to finish. Similarly, the photo processing and printing facility 224 may ship the photo tiles 110 without the second polarity magnets 156 to the manufacturing facility 226 or the central facility to apply the second polarity magnets 156; or apply the second polarity magnets 156 at the photo processing and printing facility 224.

Depending on which facility finishes which manufacturing process, the finished portions of interchangeable image display device 100 may be assembled at the manufacturing facility 226 or the central facility 202 and then sent to the customer.

Figure 15A:
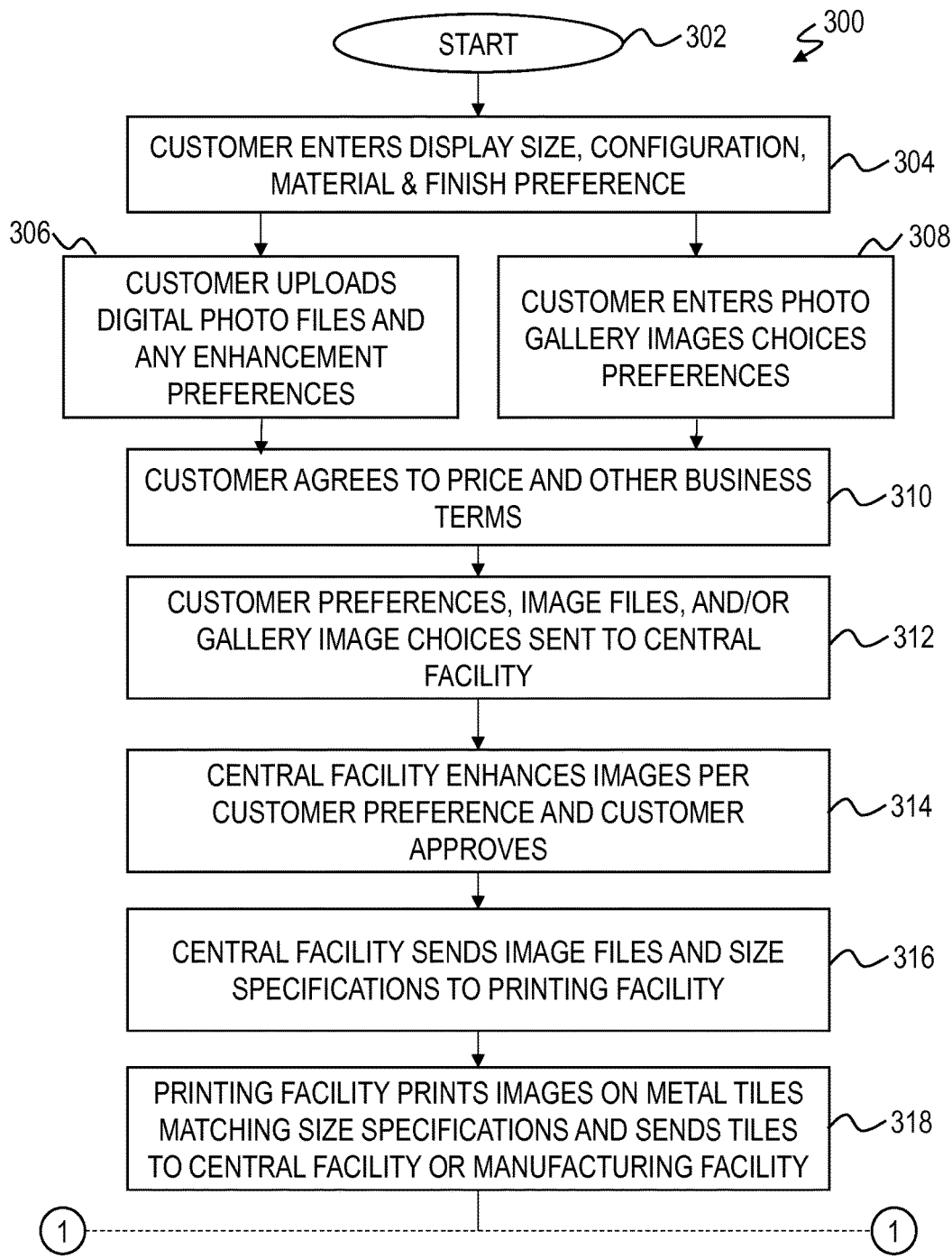
FIG. 15A is a flow chart of a first portion of a method for creating an interchangeable image display device and system according to an exemplary embodiment of the present invention.

Referring now to FIG. 15A, a first portion of a method 300 for creating the interchangeable image display device 102 and system 100 is illustrated in a flow chart. The method starts at step 302. The customer 216 may enter through a computer interface 220 display device 102 size, configuration, material, finish and other preference (step 304). The customer 216 may then upload customer images or choose library images for the photo tiles 110 (steps 306, 308). The customer 216 may then agree to price and other business terms such as copyright terms, and delivery terms (step 310). The customer preferences, and image files or library image choices are then sent to the central facility 202 (step 312).

The central facility 202 may enhance the images sent by the customer 216 and communicate with the customer 216 to have the customer 216 approve the image enhancements (step 314). The central facility 202 may then send the enhanced image files and/or library images, and photo tile 110 preferences to the photo processing and printing facility 224 (step 316). The photo processing and printing facility 224 may print the customer images and/or library images onto the photo tiles 110 in line with the customer preferences which may include size, finish, shape, and/or edge choices. The photo processing and printing facility 224 may send the finished photo tiles to the manufacturing facility 226 or the central facility (step 318). The method 300 may continue in FIG. 15B.

Figure 15B:
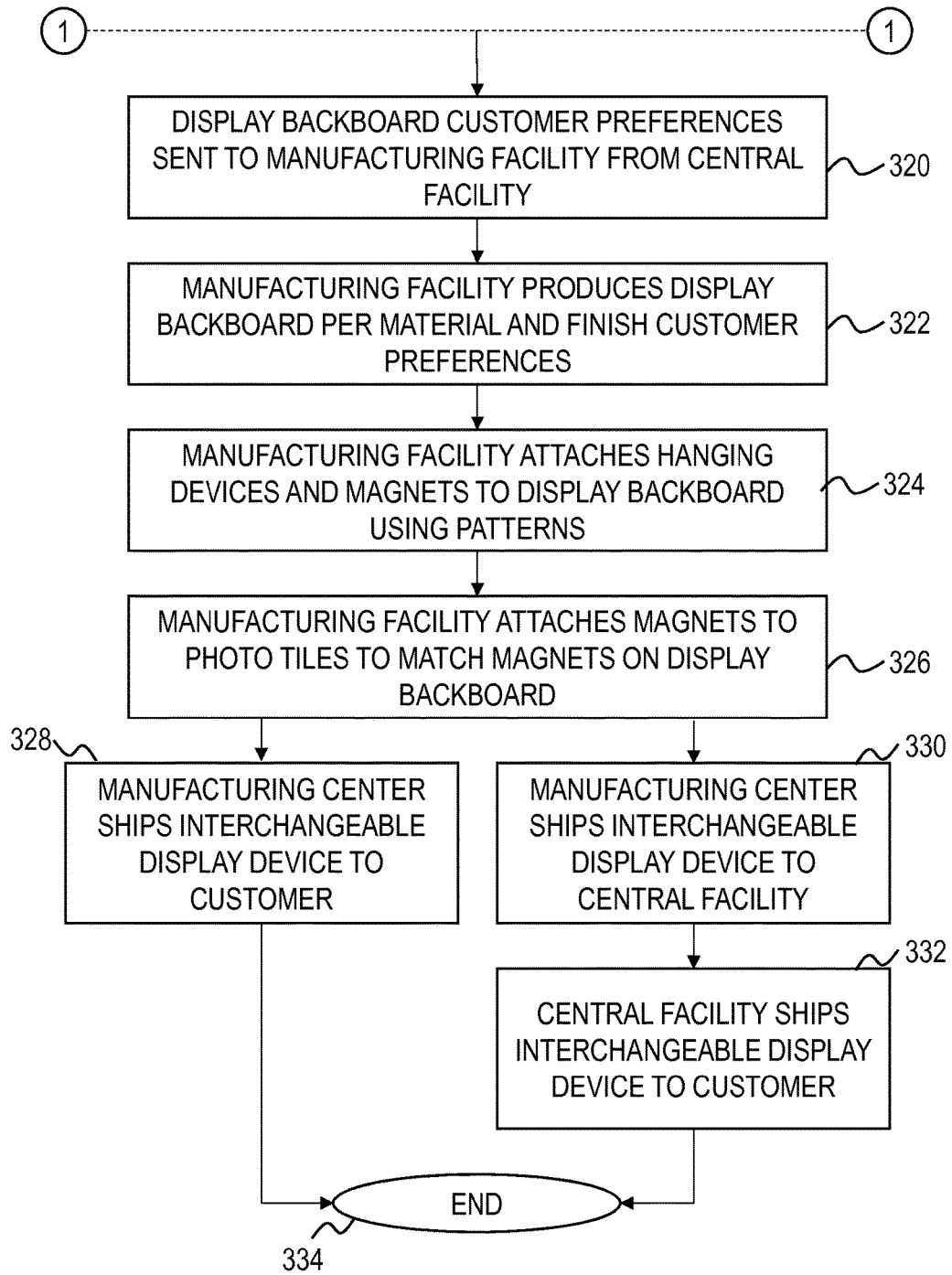
FIG. 15B is a flow chart of a second portion of the method for creating an interchangeable image display device and system of FIG. 15A.

Referring now to FIG. 15B, a second portion of the method 300 for creating the interchangeable image display device 102 and system 100 is illustrated in a flow chart. The central facility 202 may send the customer preferences for the display backboard 108 to the manufacturing facility including size, material, and finish (step 320). The manufacturing facility 226 may produce the display backboard 108 without the hanging devices 146, 148 and the first polarity magnets 154, in line with the customer preferences for size, material, and finish. This may include applying a powdered paint finish to a metal display backboard 108, or applying a polyurethane finish to a wood display backboard 108 (step 322).

The manufacturing facility may attach the hanging devices 146, 148, and the first polarity magnets 154 to the display backboard 108. In one embodiment, the manufacturing facility 226 may use patterns to attach the hanging devices 146, 148, and the first polarity magnets 154 to the display backboard 108 (step 324). The manufacturing facility may attach second polarity magnets 156 to the photo tiles 110. In one embodiment, the manufacturing facility 226 may use patterns to attach the second polarity magnets 156 to the photo tiles 110 (step 326). In an alternative embodiment, the photo processing and printing facility 224 may ship the photo tiles 110 without the second polarity magnets 156 to the central facility 202; and the manufacturing facility 226 may ship the display backboard 108 without the hanging devices 146, 148 and the first polarity magnets 154 to the central facility 202; and the central facility may attach the second polarity magnets 156 to the photo tiles, and the hanging devices 146, 148 and the first polarity magnets 154 to the display backboard 108.

Depending on the manufacturing method decided upon, the manufacturing facility 226 may ship the finished interchangeable image display system 100 to the customer 216 (step 328); or the central facility 202 may receive the display backboard 108 from the manufacturing facility 226 (step 330) and ship the finished interchangeable image display system 100 to the customer 216 (step 330). The method ends at step 334.

Figure 16A:
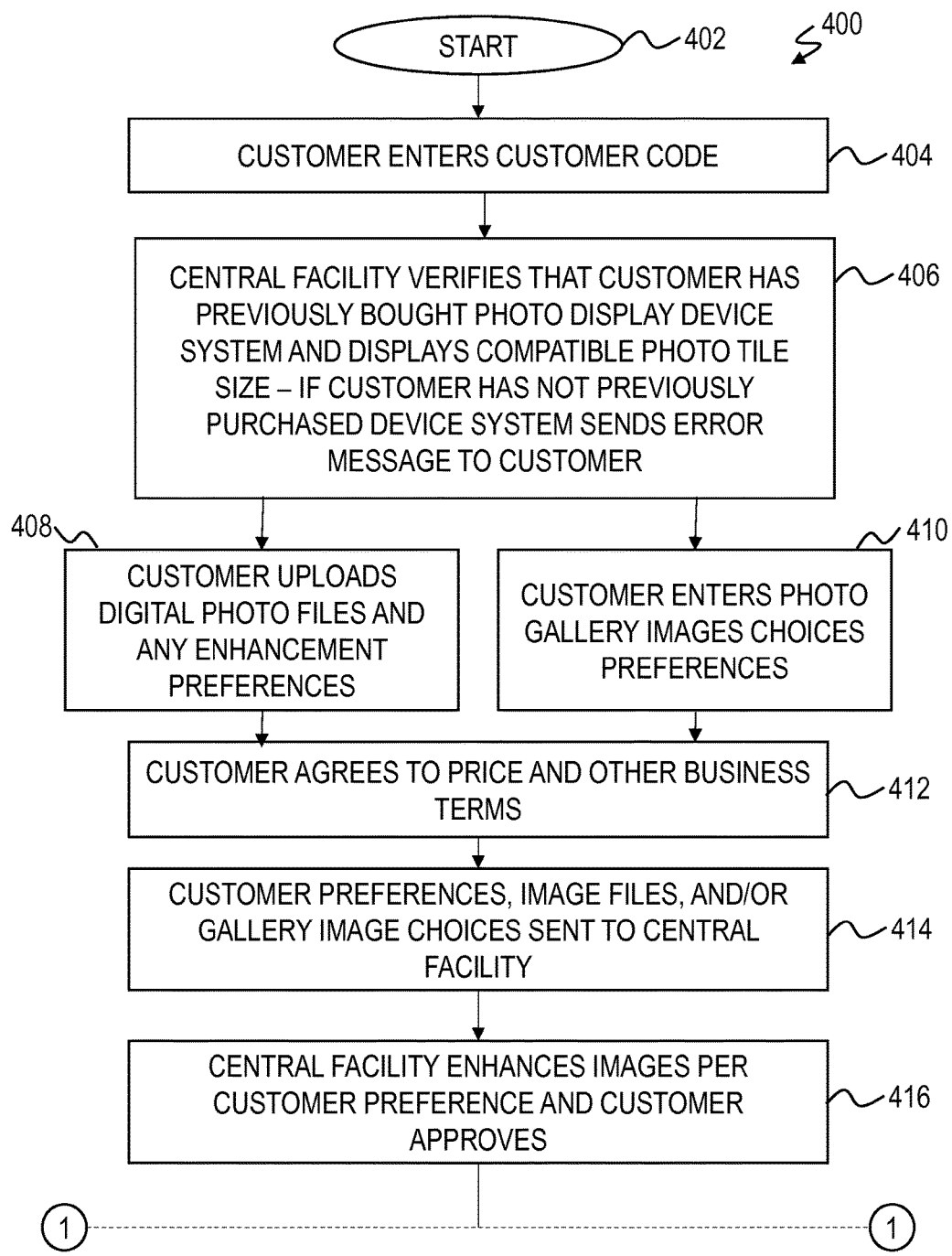
FIG. 16A is a flow chart of a first portion of a method for creating additional photo tiles for an interchangeable image display device and system according to an exemplary embodiment of the present invention.

Referring now to FIG. 16A, a first portion of a method 400 for creating additional photo tiles 110 for the interchangeable image display device 102 and system 100 is illustrated in a flow chart. A customer 216 who has previously purchased and received an interchangeable image display system 100 may wish to display new different photographs or images; or choose additional images from the image library. The customer 216 may wish to order photo tiles 110 with these images to display in place of some of the photo tiles 110 already received. The method 400 starts at step 402. The customer 216 may enter some type of identifying code into the computer interface 220 (step 404), and the computer 204 may identify the previously purchased system 100 and display photo tile 110 preferences which are compatible with previously purchased system(s) 100. If the customer 216 has not previously purchased a system 100, the computer 202 may send an error message to the customer 216 through the computer interface 220 (step 406). Steps 408-416 are similar to steps 306-314 described in relation to FIG. 15A and no further description will be given. The method 400 continues in FIG. 16B.

Figure 16B:
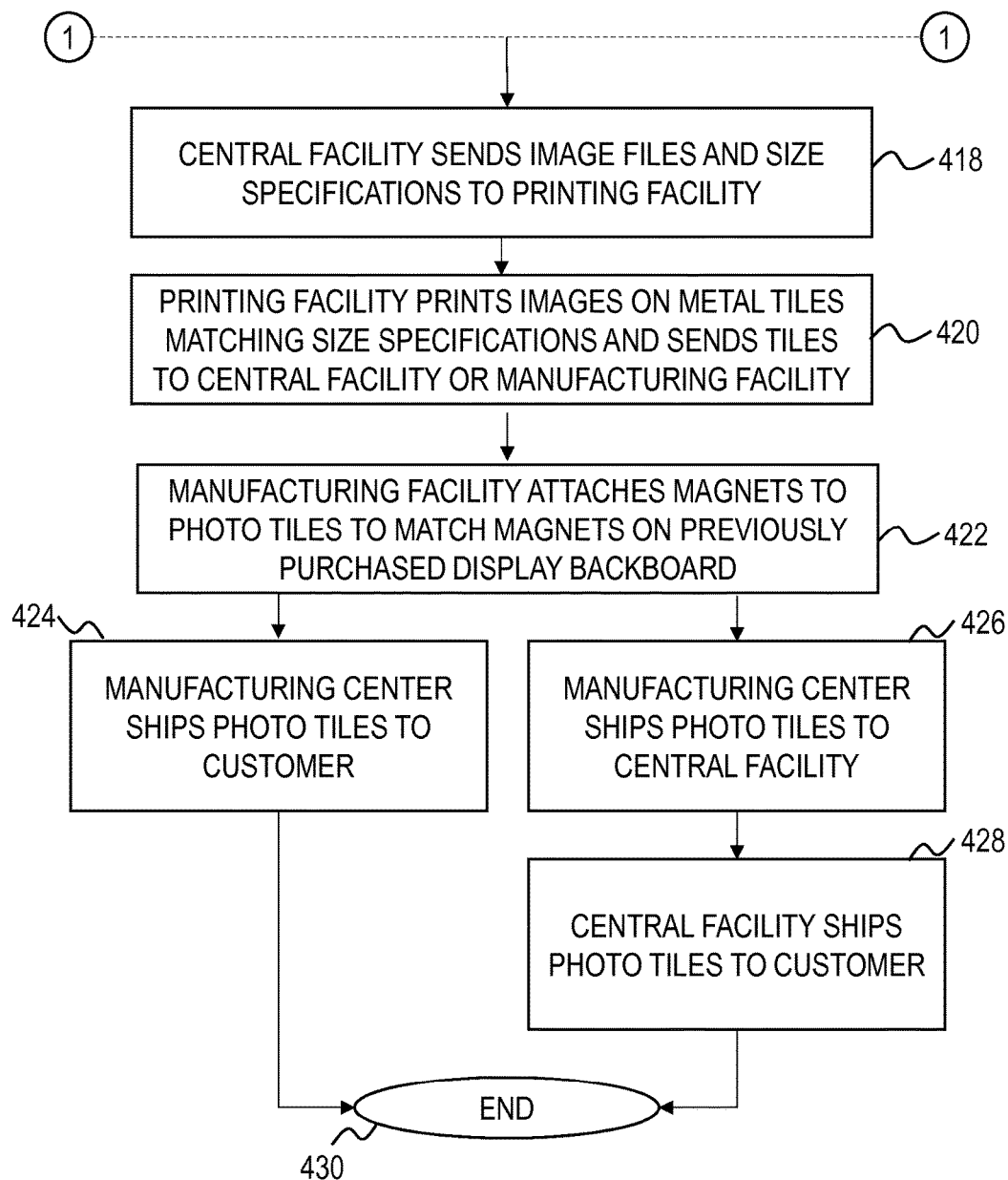
FIG. 16B is a flow chart of a second portion of the method for creating additional photo tiles for an interchangeable image display device and system of FIG. 16A.

Referring now to FIG. 16B, a second portion of the method 400 for creating additional photo tiles 110 for the interchangeable image display device 102 and system 100 is illustrated in a flow chart. Steps 418-428 are similar to steps 316-318 in FIG. 15A and steps 326-332 in FIG. 15B and will not be further described.

It will be apparent to those skilled in the art that various modifications and variations can be made to the sensor calibration system of the present disclosure. Other embodiments of the sensor calibration system will be apparent to those skilled in the art from consideration of the specification and practice of the system disclosed herein. It is intended that the specification and examples be considered as exemplary only, with a true scope of the disclosure being indicated by the following claims and their equivalents. It should be understood, of course, that the foregoing relates to exemplary embodiments of the invention and that modifications may be made without departing from the spirit and scope of the invention as set forth in the following claims.

I claim:

1. An interchangeable image display system, comprising:
a rigid hard backboard including a backboard front side coated with a protective finish and including at least one photo area, and a backboard back side opposite the backboard front side;
one or more rigid hard photo tiles including a photo tile front including an image infused into metal; and a photo tile back;
a first set of two or more first polarity magnets fixedly attached to the back board front side in each photo area in a first pattern;
a first set of two or more second polarity magnets fixedly attached to each of the photo tiles on the photo tile back in a second pattern the mirror image of the first pattern; the second polarity magnets attracted, and removeably attachable to the first polarity magnets; and
a second set of two or more second polarity magnets fixedly attached to each of the photo tiles on the photo tile back in a fourth pattern; the fourth pattern a ninety degree rotation of the second pattern.

2. The interchangeable display device system of claim 1, wherein the photo areas are the same size as the photo tiles.

3. The interchangeable display device system of claim 1, wherein there are more photo tiles than photo areas.

4. The interchangeable display device system of claim 1, wherein each photo tile front includes a different image.

5. The interchangeable display device system of claim 1, further comprising a second set of two or more first polarity magnets fixedly attached to the back board front side in each photo area in a third pattern; the third pattern a ninety degree rotation of the first pattern.

6. The interchangeable display device system of claim 1, wherein the photo areas and the photo tiles are square shaped.

7. An image display system backboard assembly, comprising:
a display backboard formed of wood comprising a backboard top; a backboard bottom; a backboard first side; a backboard second side; a backboard back; and a backboard front coated with a protective finish and including one or more photo areas, each photo area including a vertical axis dividing the photo area into two portions with identical dimensions;
and border areas separating the backboard top, the backboard bottom, the backboard first side, and the backboard second side, from the one or more photo areas, the protective finish including a polyurethane coating;
two or more first polarity magnets fixedly attached within each photo area in a pattern that forms mirror images on either side of the vertical axis; and configured to removeably attach to two or more second polarity magnets fixedly attached to a photo tile such that the photo tile covers at least part of the photo area; and
two attachment brackets fixedly attached to the backboard back and configured to hang the backboard assembly in a first position, or a second position ninety degrees rotated from the first position.

8. The image display system backboard assembly of claim 7, wherein the backboard front side further comprises at least two photo areas and a channel area between two of the photo areas.

9. The image display system backboard assembly of claim 7, wherein the photo areas are arranged in one column.

10. The image display system backboard assembly of claim 7, wherein the photo areas are arranged in rows and columns, the number of rows being equal to the number of columns.

11. The image display system backboard assembly of claim 7, wherein the attachment brackets include a aperture configured to allow the backboard to hang on a wall vertically or horizontally from a screw or nail head inserted through the aperture.

12. An interchangeable image display system, comprising:
a rigid hard backboard including a backboard front side coated with a protective finish and including at least one photo area, and a backboard back side opposite the backboard front side;
one or more rigid hard photo tiles including a photo tile front including an image infused into metal; and a photo tile back;
a first set of two or more first polarity magnets fixedly attached to the back board front side in each photo area in a first pattern;
a second set of two or more first polarity magnets fixedly attached to the back board front side in each photo area in a third pattern; the third pattern a ninety degree rotation of the first pattern; and
a first set of two or more second polarity magnets fixedly attached to each of the photo tiles on the photo tile back in a second pattern the mirror image of the first pattern; the second polarity magnets attracted, and removeably attachable to the first polarity magnets.

13. The interchangeable display device system of claim 12, wherein the photo areas are the same size as the photo tiles.

14. The interchangeable display device system of claim 12, wherein there are more photo tiles than photo areas.

15. The interchangeable display device system of claim 12, wherein each photo tile front includes a different image.

16. The interchangeable display device system of claim 12, further comprising a second set of two or more second polarity magnets fixedly attached to each of the photo tiles on the photo tile back in a fourth pattern; the fourth pattern a ninety degree rotation of the second pattern.

17. The interchangeable display device system of claim 12, wherein the photo areas and the photo tiles are square shaped.

* * * * *